United States Patent
Ohara et al.

(10) Patent No.: US 11,234,257 B2
(45) Date of Patent: Jan. 25, 2022

(54) USER EQUIPMENT, BASE STATION, AND UPLINK TRANSMISSION TIMING CONTROL METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/609,607

(22) PCT Filed: May 2, 2017

(86) PCT No.: PCT/JP2017/017309
§ 371 (c)(1),
(2) Date: Oct. 30, 2019

(87) PCT Pub. No.: WO2018/203410
PCT Pub. Date: Nov. 8, 2018

(65) Prior Publication Data
US 2020/0068597 A1    Feb. 27, 2020

(51) Int. Cl.
*H04W 72/12*    (2009.01)
*H04W 76/11*    (2018.01)
(Continued)

(52) U.S. Cl.
CPC ... *H04W 72/1268* (2013.01); *H04W 56/0045* (2013.01); *H04W 74/0833* (2013.01); *H04W 76/11* (2018.02)

(58) Field of Classification Search
CPC . H04W 74/0833; H04W 76/11; H04W 16/32; H04W 72/1268; H04W 56/0045; H04W 60/00; H04W 4/021
See application file for complete search history.

(56) References Cited

U.S. PATENT DOCUMENTS

2014/0092812 A1*  4/2014  Jang ............... H04W 64/00
                                                370/328
2017/0339717 A1*  11/2017  Futaki ............ H04W 72/0413

FOREIGN PATENT DOCUMENTS

| EP | 2763489 A1 | 8/2014 |
| JP | 2015503263 A | 1/2015 |
| JP | 2016532338 A | 10/2016 |

OTHER PUBLICATIONS

3GPP TS 36.321 V14.2.1; "3rd Generation Partnership Project; Technical Specification Group Radio Access Network; Evolved Universal Terrestrial Radio Access (E-UTRA); Medium Access Control (MAC) protocol specification (Release 14)"; Mar. 2017, (106 pages).

(Continued)

*Primary Examiner* — Anez C Ebrahim
(74) *Attorney, Agent, or Firm* — Osha Bergman Watanabe & Burton LLP (57) ABSTRACT

User equipment for communicating with a base station using a secondary cell includes a transmitter that transmits, to the base station, a preamble to start a random access in the secondary cell; a receiver that receives, within a predetermined search space, scheduling information of a random access response to be transmitted, in response to the preamble, from the base station or another base station of a timing advance group including the base station, and that receives a random access response including uplink transmission timing information based on the scheduling information; and a transmission timing controller that controls uplink transmission timing based on the uplink transmission timing information included in the random access response.

6 Claims, 4 Drawing Sheets

(51) Int. Cl.
*H04W 56/00* (2009.01)
*H04W 74/08* (2009.01)

(56) References Cited

OTHER PUBLICATIONS

International Search Report issued in International Application No. PCT/JP2017/017309, dated May 30, 2017 (5 pages).
Written Opinion issued in International Application No. PCT/JP2017/017309; dated May 30, 2019 (4 pages).
Extended European Search Report issued in the counterpart European Patent Application No. 17908754.9, dated Sep. 29, 2020 (6 pages).

* cited by examiner

USER EQUIPMENT, BASE STATION, AND UPLINK TRANSMISSION TIMING CONTROL METHOD

TECHNICAL FIELD

The present invention relates to user equipment, a base station, and an uplink timing control method.

BACKGROUND ART

A communication standard (5G or NR) that is the next generation of LTE (Long Term Evolution) and LTE-Advanced has been discussed in 3GPP (Third Generation Partnership Project). Similar to LTE, etc., it is assumed that, for establishing a connection or for reconnecting between user equipment (UE: User Equipment) and a base station (eNB or eNodeB), random access is performed in a NR system.

During random access of LTE and LTE-Advanced, the user equipment UE transmits a preamble (PRACH preamble) selected from a plurality of preambles prepared within a cell. In response to detecting a preamble, the base station eNB transmits an RAR (RACH response), which is the response information. The user equipment UE that receives the RAR transmits an RRC Connection Request, as a message 3. After receiving the message 3, the base station eNB transmits an RRC Connection Setup including cell configuration information, etc., for establishing a connection, as a message 4. After detecting that the message 4 includes its own UE ID, the user equipment UE completes the random access process and establishes a connection.

The RAR that is transmitted by the base station eNB to the user equipment UE includes a timing advance (TA: Timing Advance) value for controlling uplink transmission timing, and the user equipment UE controls the uplink transmission timing in accordance with the TA value.

Additionally, LTE-Advanced has adopted carrier aggregation (CA: Carrier Aggregation) such that communication is performed by simultaneously using a plurality of carriers while using a predetermined bandwidth (up to 20 MHz) as a basic unit. In the carrier aggregation, the carrier that is the basic unit is referred to as a component carrier (CC: Component Carrier).

When the CA is to be performed, a PCell (Primary Cell), which is a highly reliable cell for securing connectivity, and an SCell (Secondary Cell), which is a subsidiary cell, are configured for the user equipment UE. First, the user equipment UE communicates with the PCell, and may add the SCell, depending on necessity. The PCell is a cell that is the same as a single cell supporting RLM (Radio Link Monitoring) and SPS (Semi-Persistent Scheduling), etc. The SCell is a cell that is added to the PCell, so as to be configured for the user equipment UE. Addition and deletion of the SCell is performed by RRC (Radio Resource Control) signaling. The SCell is a cell for which communication (scheduling) is enabled for the first time by activation because the SCell is in an inactive (deactivated) state immediately after the SCell is configured.

For example, there is a case in which a distance between cells that are configured for CA is large, and an orthogonality between user equipment UE and any other user equipment UE may not be maintained by common timing control. In such a case, individual uplink transmission timing control is performed for each cell. Namely, a random access procedure is performed in each cell. Note that a plurality of cells with approximately equal propagation delays may be grouped as a TA group, and individual uplink transmission timing control may be performed for each TA group (cf. Non-Patent Document 1).

RELATED ART DOCUMENT

Non-Patent Document

Non-patent Document No. 1: 3GPP TS36.321 V14.2.1 (2017-03)

SUMMARY OF THE INVENTION

Problem to be Solved by the Invention

During the random access of LTE and LTE-Advanced, the user equipment UE searches, in a region called a common search space (Common Search Space), for downlink control information including RAR scheduling information, which indicates a resource with which the RAR is to be transmitted. Specifically, the user equipment UE descrambles a CRC (Cyclic Redundancy Check) with an RA-RNTI (Random Access-Radio Network Temporary Identifier) in the common search space, and attempts to decode the downlink control information.

However, the common search space is defined only in the PCell and not defined in the SCell. Accordingly, it is required to search, in the PCell, for RAR scheduling information that corresponds to a random access procedure for controlling the uplink transmission timing for the SCell.

Figure 1:
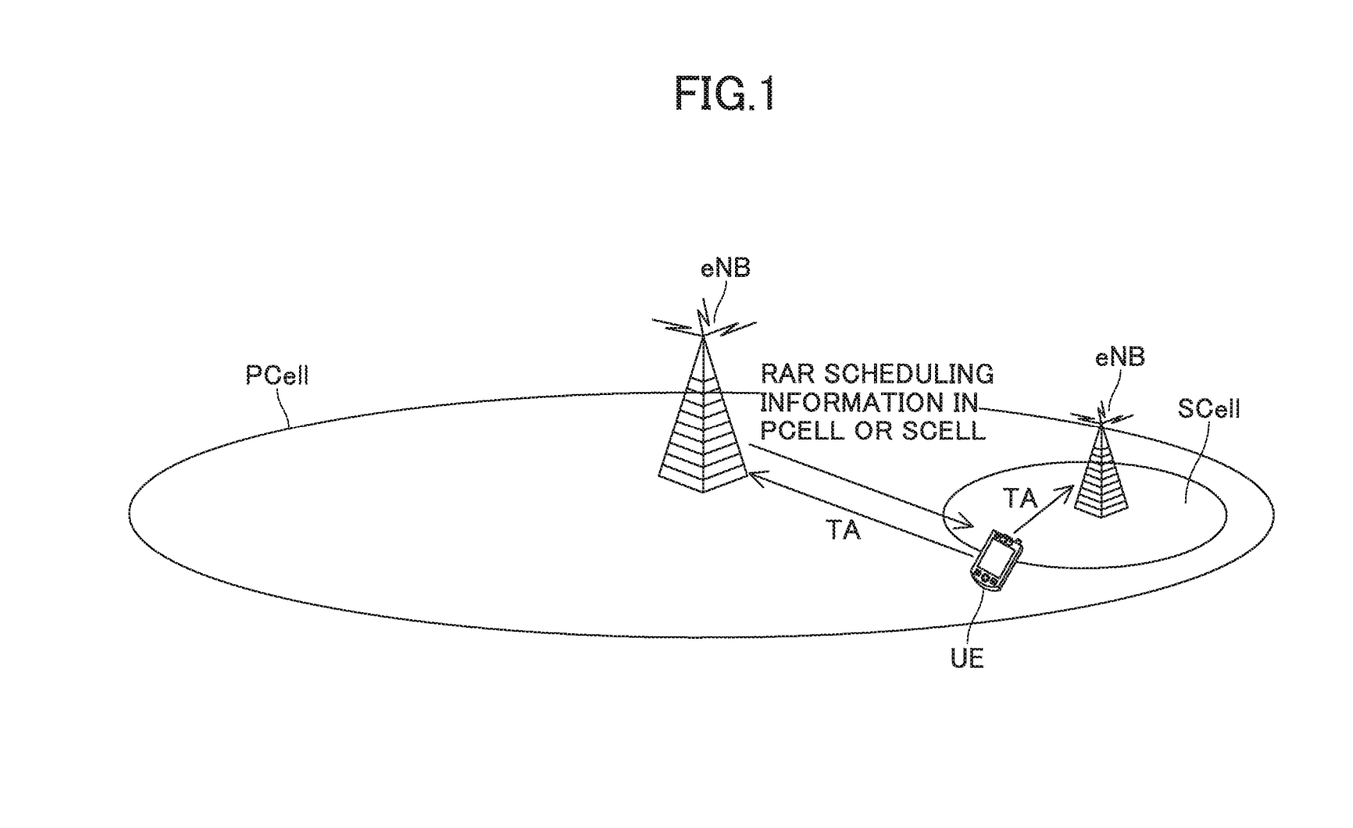
FIG. 1 is a diagram illustrating uplink transmission timing control in LTE-Advanced.

FIG. 1 is a diagram illustrating the uplink transmission timing control for LTE-Advanced. When individual uplink timing control is performed for each of the PCell and the SCell, the base station eNB corresponding to the PCell transmits downlink control information including, not only the RAR scheduling information for the PCell, but also the RAR scheduling information for the SCell. Then, the user equipment UE searches for the downlink control information including the RAR scheduling information for the PCell and the downlink control information including the RAR scheduling information for the SCell in the common search space defined in the PCell. Subsequently, the user equipment UE receives the RAR based on the RAR scheduling information, and controls the uplink transmission timing based on the TA value included in the RAR.

In the NR, it is assumed that various frequency bands become available, and a case can be assumed in which subcarrier spacing, etc., that varies depending on a cell is used so as to effectively use the characteristics of the various frequency bands. At this time, as a symbol length that is a resource allocation unit in a time direction differs depending on a cell, problems may occur such that, a method of setting up an RAR window is complicated because the symbol length on which configuration of the RAR window should be based is unclear; and such that, by transmitting the RAR scheduling information in accordance with a cell with a long symbol length, latency until receiving the RAR increases compared with the latency assumed for a cell with a short symbol length unit. Accordingly, it is desirable to transmit, within the SCell or within the TA group including the SCell, the downlink control information including the RAR scheduling information that is used for the SCell.

The present invention proposes a structure for implementing uplink transmission timing control, even if the resource allocation unit in the time direction differs depending on a cell, by allowing to transmit the downlink control information including the RAR scheduling information also in the SCell.

Means to Solve the Problem

User equipment according to an aspect of the present invention is user equipment for communicating with a base station using a secondary cell, the user equipment including a transmitter that transmits, to the base station, a preamble to start a random access in the secondary cell; a receiver that receives, within a predetermined search space, scheduling information of a random access response to be transmitted, in response to the preamble, from the base station or another base station of a timing advance group including the base station, and that receives the random access response including uplink transmission timing information based on the scheduling information; and a transmission timing controller that controls uplink transmission timing based on the uplink transmission timing information included in the random access response.

Advantageous Effects of the Invention

According to the present invention, by allowing to transmit the downlink control information including the RAR scheduling information also in the SCell, uplink transmission timing control can be achieved, even if the resource allocation unit in the time direction differs depending on the cell.

EMBODIMENTS OF THE INVENTION

In the following, an embodiment of the present invention is described by referring to the drawings. Note that, the embodiment described below is merely an example, and embodiments to which the present invention is applied are not limited to the following embodiment.

In the embodiment, the description is provided using terms defined in LTE, as appropriate. Additionally, for operation of a radio communication system, existing technology specified in LTE can be used, as appropriate. However, the existing technology is not limited to LTE. The "LTE" used in this specification is used in broad meaning including LTE-Advanced and systems according to on and after LTE-Advanced, unless as specified otherwise. Furthermore, the present invention can be applied to a system other than LTE to which the random access is applied.

Further, terms which are used in existing LTE, such as CA, PCell, SCell, RACH, a preamble, RAR, and TA, are used in the embodiment; however, this is for convenience of the description, and signals and functions, etc., similar to these may be called by other names.

<Overview of the Radio Communication System>

Figure 2:
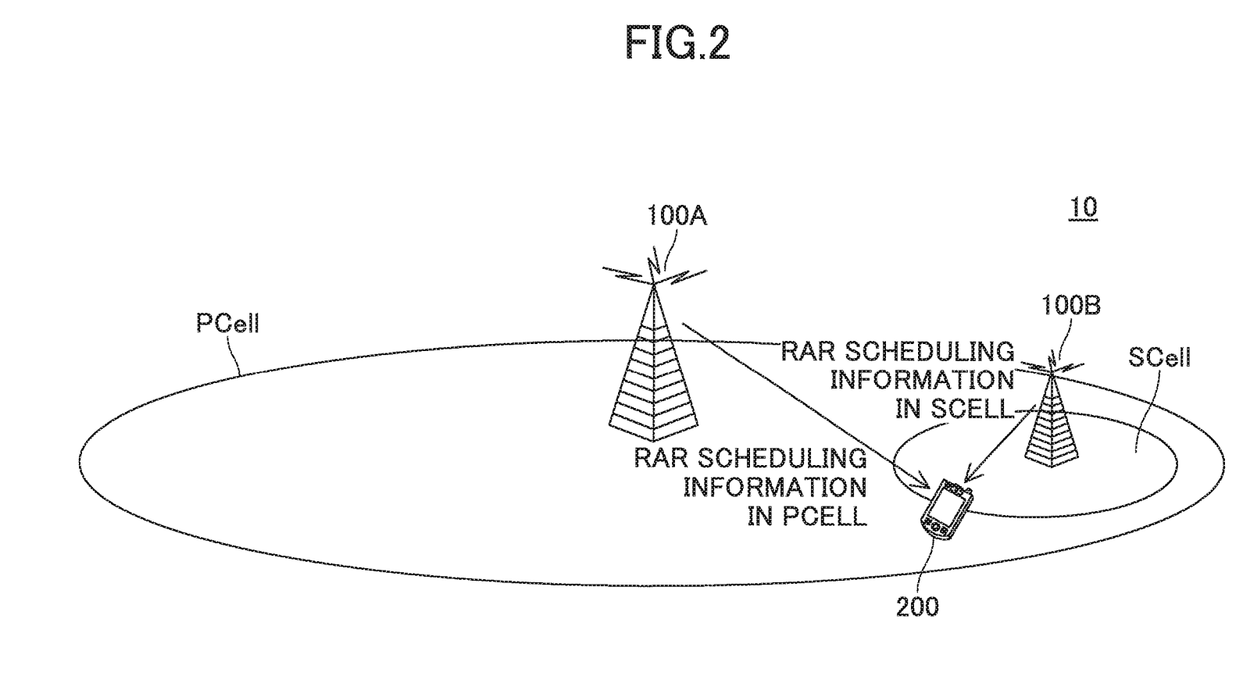
FIG. 2 is a diagram illustrating uplink timing control in a radio communication system according to an embodiment of the present invention.

FIG. 2 is a configuration diagram of the radio communication system 10 according to the embodiment. As depicted in FIG. 2, the radio communication system 10 according to the embodiment includes base stations 100A and 100B (the base stations 100A and 100B may be collectively referred to as the base station 100, hereinafter); and user equipment 200. In the example of FIG. 2, two base stations 100 and a single unit of user equipment 200 are depicted; however, three or more base stations 100 may be provided, or a plurality of units of user equipment 200 may be provided. Here, the base station 100 may be referred to as the BS, and the user equipment 200 may be referred to as the UE.

The base station 100 is capable of accommodating one or more (e.g., three) cells (which may also be referred to as sectors). When the base station 100 accommodates a plurality of cells, the whole coverage of the base station 100 can be divided into a plurality of smaller areas; and, in each smaller area, a communication service can be provided by a base station subsystem (e.g., an indoor small base station RRH: Remote Radio Head). The term "cell" or "sector" refers to a part of or the whole coverage area of the base station and/or the base station subsystem that provides the communication service in the coverage. Furthermore, the terms "base station," "eNB," "cell," and "sector" can be used interchangeably in this specification. The base station 100 may also be referred to by the terms, such as a fixed station, a Node B, an eNodeB (eNB), an access point, a femtocell, and a small cell.

The user equipment 200 may be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a hand set, a user agent, a mobile client, a client, or some other suitable terms, by a person ordinarily skilled in the art.

The user equipment 200 can simultaneously communicate with the base stations 100A and 100B by configuring the CA. For example, the user equipment 200 may use a cell provided by the base station 100A as the PCell and may use a cell provided by the base station 100B as the SCell, so as to simultaneously communicate with both the base stations 100A and 100B. Note that the base station 100A corresponding to the PCell and the base station 100B corresponding to the SCell are not necessarily different from each other, and the PCell and the SCell may be configured within the same base station. Furthermore, two or more Scells may be configured.

The subcarrier spacing used in the PCell may differ from the subcarrier spacing used in the SCell. At this time, the symbol length used in the PCell is different from the symbol length used in the SCell. Further, when a plurality of SCells are configured, the subcarrier spacing and the symbol length may differ for respective cells. Namely, the PCell and the SCell may not be handled equally in the time direction because the resource allocation unit in the time direction differs for the respective cells; and, in the random access procedure, it is required to individually configure the RAR scheduling information for the PCell and the RAR scheduling information for the SCell.

In the embodiment, the downlink control information including the RAR scheduling information is allowed to be transmitted, not only in the PCell, but also in the SCell. The specific procedure is described below.

<Uplink Transmission Timing Control in the Radio Communication System>

In the following, mainly, description is of a random access procedure for uplink transmission timing control between the base station 100B corresponding to the SCell and the user equipment 200; however, the procedure described below can be applied to the base station 100A corresponding to the PCell.

Figure 3:
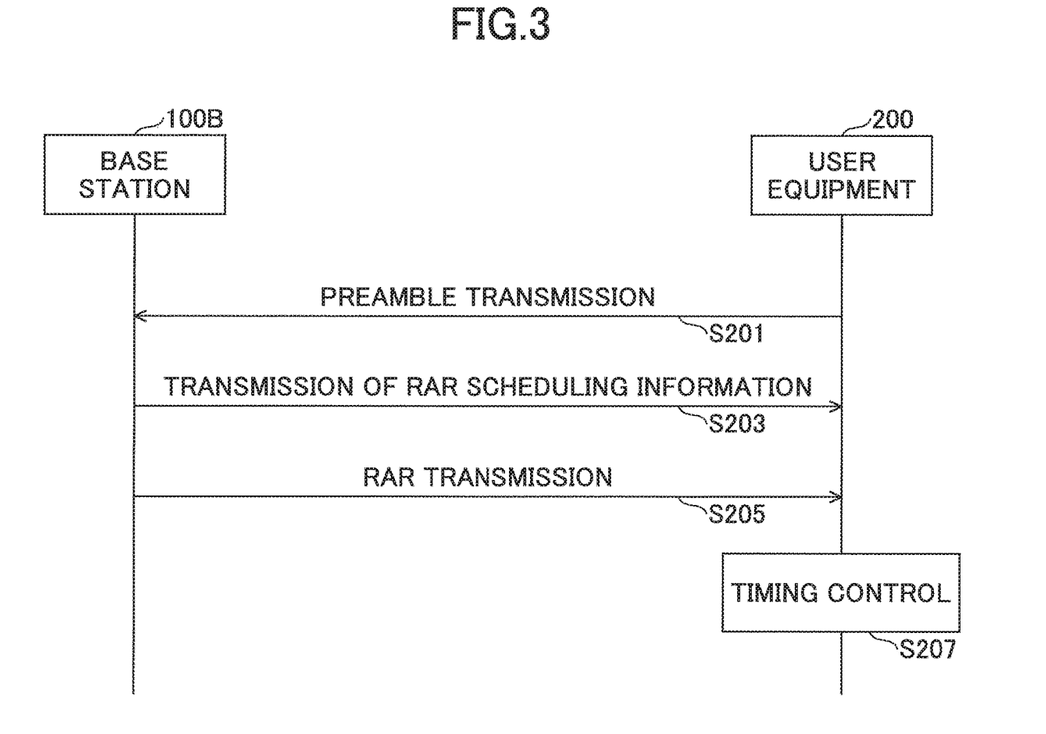
FIG. 3 is a sequence diagram illustrating uplink transmission timing control in the radio communication system according to the embodiment of the present invention.

When the user equipment 200 attempts to establish a connection or resynchronization with the base station 100B for originating a call or for handover, etc., random access is performed. In the random access, the channel for firstly transmitting a preamble is referred to as a physical random access channel (PRACH: Physical Random Access Channel). As for the random access, there are a contention type and a non-contention type. During the contention-based random access, the user equipment 200 transmits, to the base station 100B, a preamble that is randomly selected from a plurality of preambles prepared in advance. During the non-contention based random access, the user equipment 200 transmits a preamble to the base station 100B using a preamble or a resource indicated by the base station 100B (S201).

Upon detecting a preamble, the base station 100B transmits an RAR that is the response information. The RAR is transmitted using a resource indicated by the RAR scheduling information. The RAR scheduling information may include one or more resources of a frequency resource, a time resource, a code resource, etc., which are used for transmitting the RAR; and may also include one or more ranges of the respective one or more ranges.

The base station 100B transmits downlink control information including the RAR scheduling information within a predetermined search space (S203). It is not always required that the downlink control information including the RAR scheduling information is transmitted from each base station included in the SCell; and, the downlink control information including the RAR scheduling information may be transmitted from any base station of a TA group to which the base station 100 B belongs. The TA group is a group of cells in which the same uplink transmission timing control is performed; and, for example, the TA group may be configured based on a difference, etc., in estimated propagation delay, and may be signaled by RRC signaling, etc. The predetermined search space may be a search space individually configured for the user equipment (UE specific search space), or may be a search space commonly configured for all units of user equipment in a cell or a part of the units of user equipment in the cell. For example, for all units of user equipment within a cell, a same common search space may be configured. Further, as described below, for the search space, a resource, etc., used for a SS (Synchronization Channel) block, for example, may be used as a reference; and, thus, a common search space may be configured for a part of users who can receive the SS block. In the following description, unless as explicitly described otherwise, a search space that is commonly configured for units of user equipment within a cell may be a search space commonly configured for all the units of user equipment within the cell, or a search space commonly configured for a part of the units of user equipment within the cell. As described above, also in the SCell, a search space may be defined that is commonly configured for units of user equipment within a cell. For example, the search space may be a search space commonly used for another purpose, such as paging information; or may be a search space dedicated for random access. The search space commonly configured for the units of user equipment within the cell may be a position or a range of the search space indicated by a specific search space number; or a position or a range of the search space indicated by a specific resource position. Additionally, for the position or the range of the search space, a resource of a certain channel or signal may be used as a reference. For example, the position or the range of the search space may be determined using a frequency resource specified by the PRACH configuration or a frequency resource used for the SS block as a reference. The predetermined search space may be determined in advance by a specification within a system; or the predetermined search space may be signaled from the base station 100A corresponding to the PCell or from the base station 100B corresponding to the SCell using broadcast information, RRC (Radio Resource Control) signaling, downlink control information (DCI: Downlink Control Information), and so forth (not depicted).

The user equipment 200 receives the RAR scheduling information within the predetermined search space. When the RAR scheduling information is transmitted in the search space individually configured for the user equipment, the user equipment 200 attempts to decode the RAR scheduling information, for example, by descrambling the CRC using an identifier of the user equipment 200, such as a C-RNTI (Cell-Radio Network Temporary Identifier) configured in the PCell. When the RAR scheduling information is transmitted in the search space commonly configured for the units of user equipment within the cell, the user equipment 200 attempts to decode the RAR scheduling information, for example, by descrambling the CRC using a random access identifier, such as RA-RNTI (Random Access-Radio Network Temporary Identifier).

Then, the base station 100B transmits the RAR, which is the response information of the detected preamble, based on the RAR scheduling information (S205). Further, the user equipment 200 receives the RAR, based on the RAR scheduling information. The RAR includes timing information (e.g., a TA value) used for the uplink transmission timing control.

The user equipment 200 controls the uplink transmission timing, based on the timing information included in the RAR (S207). Subsequently, by transmitting a connection request to the base station 100B, the user equipment 200 establishes the connection with the base station 100B.

Note that, the uplink transmission timing control described by referring to FIG. 3 can be applied to both the contention-based random access and the non-contention based random access; however, the above-described uplink transmission timing control may be used only for the non-contention based random access.

<Functional Configuration of the Base Station>

Figure 4:
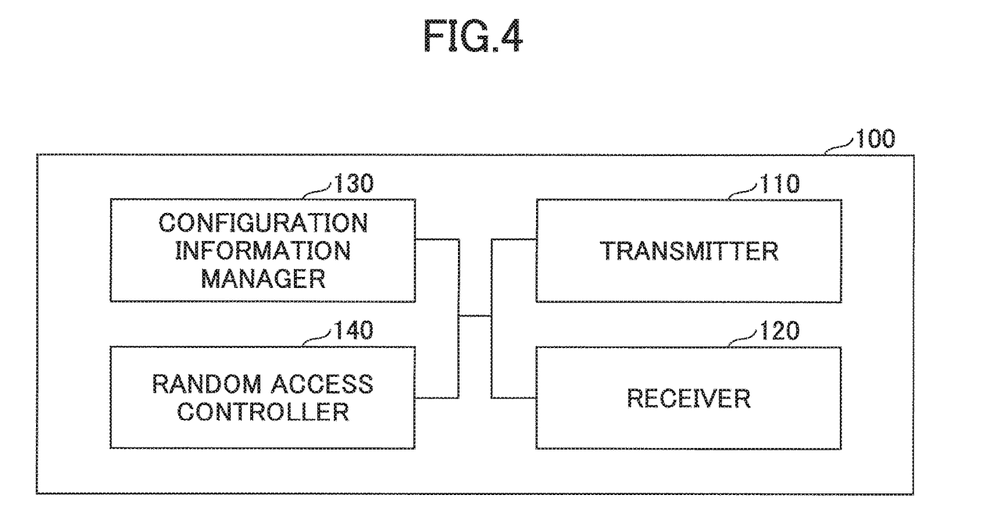
FIG. 4 is a block diagram illustrating an example of a functional configuration of a base station.

FIG. 4 is a diagram illustrating an example of a functional configuration of the base station 100. The base station 100 includes a transmitter 110; a receiver 120; a configuration information manager 130; and a random access controller 140. Note that the names of the functional units used in FIG. 4 are merely examples, and other names may be used.

The transmitter 110 is configured to generate a lower layer signal from higher layer information, and to wirelessly transmit the signal. The receiver 120 is configured to wirelessly receive various types of signals, and to retrieve higher layer information from a received signal.

The configuration information manager 130 stores configuration information that is configured in advance, and determines and retains the configuration information (information indicating a predetermined search space, etc.) to be dynamically and/or semi-statically configured for the user equipment 200. The configuration information manager 130 transfers, to the transmitter 110, the configuration information to be dynamically and/or semi-statically configured for the user equipment 200, and causes the transmitter 110 to transmit the configuration information.

The random access controller 140 controls a random access procedure with the user equipment 200. The random access controller 140 generates the RAR scheduling information for the user equipment 200; masks the RAR scheduling information using an identifier of the user equipment 200 or an identifier for random access; and causes the transmitter 110 to transmit the RAR scheduling information. Additionally, upon detecting the preamble transmitted from the user equipment 200, the random access controller causes the transmitter 110 to transmit the RAR based on the RAR scheduling information; and, upon receiving the RRC Connection Request from the user equipment 200, the random access controller causes the transmitter 110 to transmit the RRC Connection Setup.

<Functional Configuration of the User Equipment>

Figure 5:
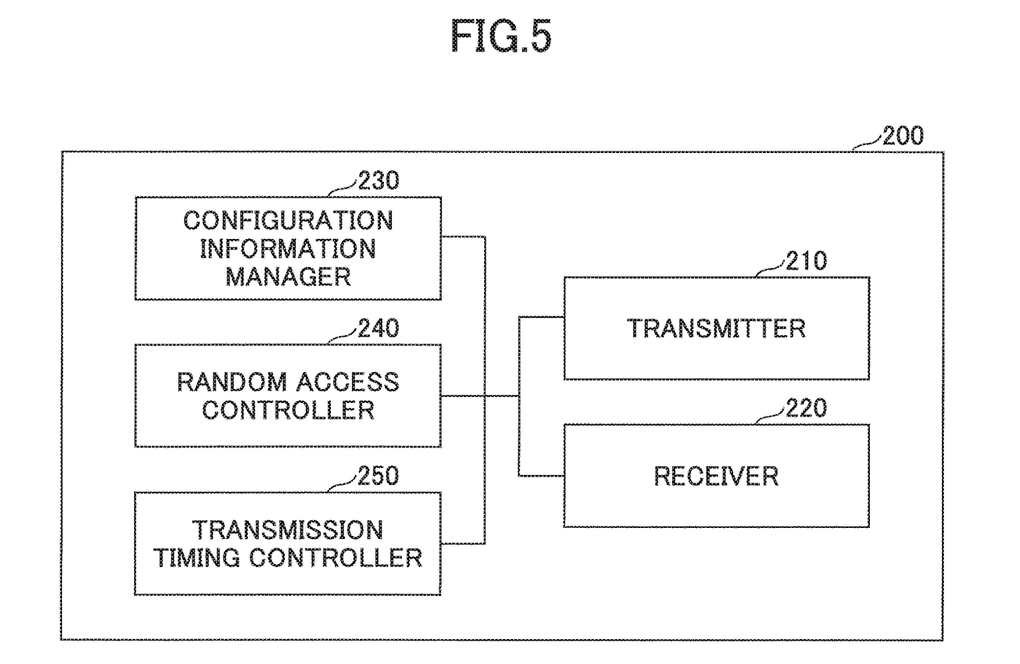
FIG. 5 is a block diagram illustrating an example of a functional configuration of user equipment.

FIG. 5 is a diagram illustrating an example of a functional configuration of the user equipment 200. The user equipment 200 includes a transmitter 210; a receiver 220; a configuration information manager 230; a random access controller 240; and a transmission timing controller 250. Note that the names of the functional units used in FIG. 5 are merely examples, and other names may be used.

The transmitter 210 is configured to generate a lower layer signal from higher layer information, and to wirelessly transmit the signal. The receiver 220 is configured to wirelessly receive various types of signals, and to retrieve higher layer information from a received signal.

The configuration information manager 230 stores configuration information that is configured in advance, and stores the configuration information (information indicating a predetermined search space, etc.) to be dynamically and/or semi-statically configured by the base station 100, etc.

The random access controller 240 controls a random access procedure with the base station 100. When the user equipment 200 establishes a connection with the base station 100 or reestablishes synchronization with the base station 100 due to call origination or handover, etc., the random access controller 240 causes the transmitter 210 to transmit a preamble. Additionally, the random access controller 240 attempts to decode the downlink control information including the RAR scheduling information within the predetermined search space; and, upon successfully decoding the RAR scheduling information, the random access controller 240 attempts to receive the RAR based on the RAR scheduling information. Upon receiving the RAR from the base station 100, the random access controller 240 causes the transmitter 210 to transmit the RRC Connection Request.

The transmission timing controller 250 controls the uplink transmission timing based on the uplink transmission timing information (a TA value, etc.) included in the RAR.

<Hardware Configuration Example>

Note that the block diagrams used for the description of the above-described embodiment indicate blocks in units of functions. These functional blocks (components) can be implemented by any combination of hardware and/or software. Furthermore, a method for implementing each functional block is not particularly limited. Namely, each functional block may be implemented by a single device that is physically and/or logically connected; or may be implemented by a plurality of devices by directly and/or indirectly connecting (e.g., by a wire line and/or a radio link) two or more devices that are physically and/or logically separated.

Figure 6:
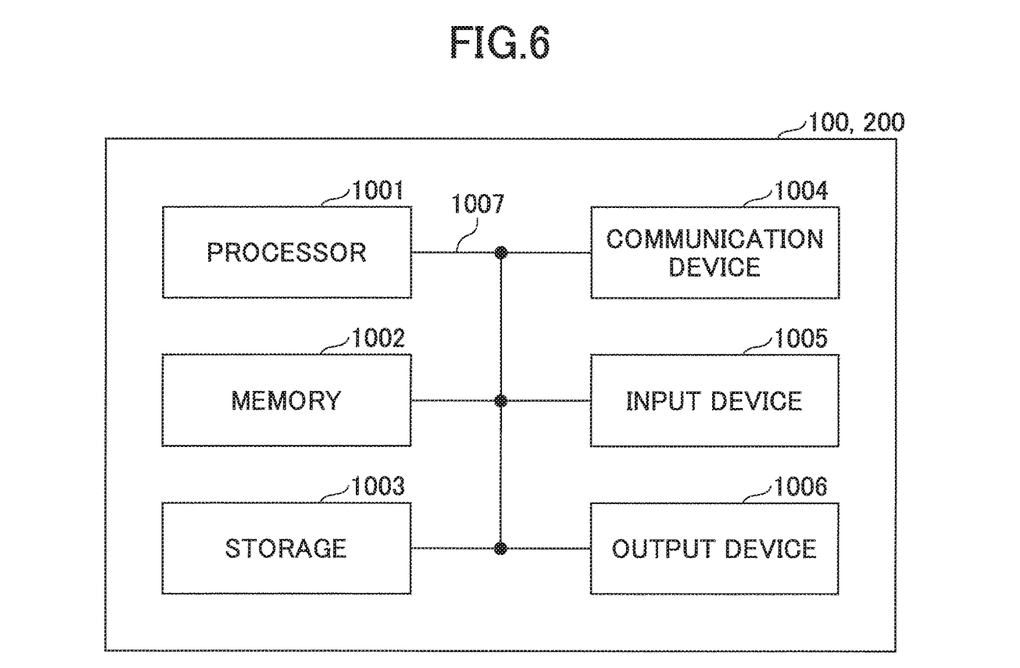
FIG. 6 is a diagram illustrating an example of a hardware configuration of a radio communication system according to the embodiment of the present invention.

For example, each of the base station, the user equipment, and so forth according to the embodiment of the present invention may function as a computer for executing the process of the random access method according to the present invention. FIG. 6 is a diagram illustrating an example of a hardware configuration of a radio communication device that is the base station 100 or the user equipment 200 according to the embodiment of the present invention. Each of the above-described base station 100 and the user equipment 200 may be physically configured as a computer device including a processor 1001; a memory 1002; a storage 1003; a communication device 1004; an input device 1005; an output device 1006; a bus 1007, and so forth.

Note that, in the following description, the term "apparatus" can be interchangeable with a circuit, a device, a unit, etc. The hardware configuration of each of the base station 100 and the user equipment 200 may be configured to include one or a plurality of devices illustrated in the drawings; or may be configured not to include a part of the devices.

After loading predetermined software (program) on hardware, such as the processor 1001 and the memory 1002, each function of the base station 100 and the user equipment 200 can be implemented by the processor 100 by operating to control the communication by the communication device 1004 and/or reading out data and/or writing data in the memory 1002 and the storage 1003.

The processor 1001, for example, operates the operating system to control the entire computer. The processor 1001 may be formed of a central processing unit (CPU: Central Processing Unit) including an interface with a peripheral device; a control device; a processor; a register; and so forth. For example, the transmitter 110, the receiver 120, the configuration information manager 130, and the random access controller 140 of the above-described base station 100, or the transmitter 210, the receiver 220, the configuration information manager 230, the random access controller 240, and the transmission timing controller 250 of the user equipment 200 may be implemented by the processor 1001.

Furthermore, the processor 1001 reads out a program (program code), a software module, and/or data from the storage 1003 and/or the communication device 1004 onto the memory 1002, and executes various processes in accordance with these. As the program, a program may be used that causes a computer to execute at least a part of the operation described in the above-described embodiment. For example, the transmitter 110, the receiver 120, the configuration information manager 130, and the random access controller 140 of the above-described base station 100, or the transmitter 210, the receiver 220, the configuration information manager 230, the random access controller 240, and the transmission timing controller 250 of the user equipment 200 may be implemented by a control program that is stored in the memory 1002 and operated by the processor 1001; and, similarly, other functional blocks may be implemented. It is described that each of the above-described processes is executed by the single processor 1001; however, it can be simultaneously or sequentially executed by two or more processors 1001. The processor 1001 may be implemented by one or more chips. Here, the program may be transmitted from a network through an electric telecommunication line.

The memory 1002 may be a computer readable recording medium, and may be formed of, for example, at least one of a ROM (Read Only Memory), an EPROM (Erasable Programmable ROM), an EEPROM (Electrically Erasable Programmable ROM), a RAM (Random Access Memory), and so forth. The memory 1002 may be referred to as a register, a cache, a main memory (main memory device), and so forth. The memory 1002 can store a program (program code), a software module, and so forth that can be executed to implement the random access method according to the embodiment of the present invention.

The storage 1003 is a computer readable recording medium, and may be formed of, for example, at least one of an optical disk, such as a CD-ROM (Compact Disc ROM); a hard disk drive; a flexible disk; a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and so forth. The storage 1003 may be referred to as an auxiliary storage device. The above-described storage medium may be, for example, a database including the memory 1002 and/or the storage 1003, a server, or another appropriate medium.

The communication device 1004 is hardware (transceiver device) for executing communication between computers through a wired network and/or a wireless network; and, for example, the communication device 1004 may also be referred to as a network device, a network controller, a network card, a communication module, and so forth. For example, each of the above-described transmitter 110, the receiver 120, the transmitter 210, the receiver 220, and so forth may be implemented by the communication device 1004.

The input device 1005 is an input device (e.g., a keyboard, a mouse, a microphone, a switch, a button, a sensor, etc.) for receiving an input from the outside. The output device 1006 is an output device (e.g., a display, a speaker, a LED lamp, etc.) for providing output to the outside. Here, the input device 1005 and the output device 1006 may be integrated (e.g., a touch panel).

Further, each of the devices, such as the processor 1001 and/or the memory 1002, is connected by a bus 1007 for communicating information. The bus 1007 may be formed of a single bus, or may be formed of buses that differ depending on a pair of devices.

Further, each of the base station 100 and the user equipment 200 may be formed to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part or all of the respective functional blocks may be implemented by the hardware. For example, the processor 1001 may be implemented by at least one of these hardware components.

EFFECT OF THE EMBODIMENT OF THE PRESENT INVENTION

According to the embodiment of the present invention, by allowing the downlink control information including the RAR scheduling information to be transmitted also in the SCell, the uplink transmission timing control can be achieved, even if the resource allocation unit in the time direction differs depending on a cell. Namely, as the RAR scheduling information is transmitted in the predetermined search space, not only in the PCell, but also in the SCell, the user equipment can implement the uplink transmission timing control in accordance with the RAR scheduling information received in each cell.

Furthermore, by using a search space individually configured for the user equipment as the predetermined search space, the RAR scheduling information can be transmitted using the search space in the SCell of LTE, without newly adding a search space commonly configured for the user equipment.

Furthermore, by using a search space commonly configured for the user equipment as the predetermined search space, the RAR scheduling information can be transmitted by a method that is the same as that of the PCell, namely, by using an identifier for random access, such as the RA-RNTI.

Additional Embodiments

Each aspect/embodiment described in this specification may be applied to LTE (long term evolution), LTE-A (LTE-advanced), SUPER 3G, IMT-Advanced, 4G, 5G, FRA (future radio, W-CDMA (registered trademark), GSM (registered trademark), CDMA2000, UMB (ultra mobile broadband), IEEE 802.11 (Wi-Fi), IEEE 802.16 (WiMAX), IEEE 802.20, UWB (ultra-wideband), Bluetooth (registered trademark), any other systems using an appropriate system and/or next generation systems extended based on these systems.

The terms "system" and "network" used in this specification are interchangeably used.

The specific operation that is described in this specification to be performed by the base station may be performed by an upper node of the base station in some cases. In a network formed of one or more network nodes that includes a base station, it is clear that various operations to be performed for communication with a terminal can be performed by the base station and/or another network node other than the base station (for example, the MME or the S-GW can be considered; however, it is not limited to these). In the above, the case is exemplified where there is one network node other than the base station; however, a combination of a plurality of other network nodes (e.g., the MME and the S-GW) may be used.

Information, etc., can be output from an upper layer (or lower layer) to a lower layer (upper layer). Input/output may be executed through a plurality of networks.

The input/output information, etc., may be stored in a specific location (e.g., a memory); or may be maintained by a management table. The input/output information, etc., may be overwritten, updated, or appended. The output information, etc., may be deleted. The input information, etc., may be transmitted to another device.

Notification of information is not limited to the aspect/embodiment described in the present specification, and may be performed by other methods. For example, notification of information may be performed via physical layer signaling (for example, DCI (Downlink Control Information) or UCI (Uplink Control Information)); upper-layer signaling (for example, RRC (Radio Resource Control) signaling, MAC (Medium Access Control) signaling, broadcast information (MIB (Master Information Block), or SIB (System Information Block)); other signals, or by a combination thereof. Furthermore, RRC signaling may be referred to as an RRC message; and the RRC signaling may be, for example, an RRC connection setup (RRC Connection Setup) message, an RRC connection reconfiguration (RRC Connection Reconfiguration) message, and so forth.

Determination may be made by a value represented by one bit (0 or 1); may be made by a Boolean value (Boolean: true or false); or may be made by comparison of numerical values (comparison with a predetermined value, for example).

Regardless of whether it is referred to as software, firmware, middleware, microcode, hardware description language, or another name, the software should be interpreted broadly so as to imply a command, a command set, a code, a code segment, a program code, a program, a subprogram, a software module, an application, a software application, a software package, a routine, a subroutine, an object, an executable file, an execution thread, a procedure, a function, and so forth.

Furthermore, software, a command, and so forth may be transmitted and received through a transmission medium. For example, when the software is transmitted from a Web site, a server, or another remote source using wired technology, such as a coaxial cable, an optical fiber cable, a twisted pair, and a digital subscriber line (DSL), and/or wireless technology, such as infrared, radio, and microwave, the wired technology and/or wireless technology is included within the definition of the transmission medium.

Information, signals, etc., described in the present specification may be represented using any of various other techniques. For example, data, instructions, commands, information, signals, bits, symbols, chips, and so forth, which may be described in the entire description, may be represented by voltage, current, electromagnetic waves, magnetic field or magnetic particles, optical field or photons, or any combination thereof.

Note that the terms described in this specification and/or the terms necessary for understanding this specification may be replaced with terms having the same or similar meaning. For example, the channel and/or symbol may be signaling (signal). Furthermore, a signal may be a message. Furthermore, a component carrier (CC) may be referred to as a carrier frequency, a cell, and so forth.

Furthermore, the information, parameters, and so forth, which are described in the specification, may be represented by absolute values; may be represented as relative values from predetermined values; or may be represented by any other corresponding information. For example, the radio resource may be indicated by an index.

The names used for the above-described parameters should not be interpreted restrictively in any way. Furthermore, mathematical expressions, etc., using these parameters may be different from the mathematical expressions explicitly disclosed in this specification. The various channels (e.g., PUCCH, PDCCH, etc.) and information elements (e.g., TPC) can be identified by any suitable name. Thus, the various names assigned to the various channels and information elements should not be interpreted restrictively in any way.

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

Any reference to elements using names, such as "first" and "second," which are used in this specification, does not generally limit the quantity or order of these elements. These names are used in the specification as a convenient method for distinguishing two or more elements. Accordingly, the reference to the first and second elements does not imply that only the two elements can be adopted here, or does not imply that the first element must precede the second element in any way.

As long as "include," "including," and the variations thereof are used in the specification and the claims, these terms are intended to be inclusive, similar to the term "comprising." Furthermore, it is intended that the term "or" used in this specification or the claims is not "exclusive OR."

Processing procedures, sequences, flowcharts, and so forth of each embodiment/modified example described in the specification may be exchanged as long as there is no contradiction. For example, for the methods described in the specification, the elements of the various steps are presented in an exemplary order and are not limited to a specific order presented.

Each aspect/embodiment described in the specification may be used alone; may be combined to be used; or may be switched in accordance with execution. Furthermore, notification of predetermined information (e.g., notification of "being X") is not limited to notification that is made explicitly; and the notification may be made implicitly (e.g., notification of the predetermined information is not performed).

The present invention is described in detail above; however, it is apparent to a person ordinarily skilled in the art that the present invention is not limited to the embodiments described in the present specification. The present invention can be implemented as modifications and alterations without departing from the sprit and scope of the present invention that are defined by the descriptions of the claims. Accordingly, an object of the description of this specification is for exemplification and illustration; and the description of this specification does not have any restrictive meaning to the present invention.

LIST OF REFERENCE SYMBOLS 100 base station
110 transmitter
120 receiver
130 configuration information manager
140 random access controller
200 user equipment
210 transmitter
220 receiver
230 configuration information manager
240 random access controller
250 transmission timing controller

The invention claimed is:
1. A terminal comprising:
a receiver that receives, using an identifier of the terminal, scheduling information of a random access response transmitted from a second base station included in a group in which a first base station is included, the first base station communicating with the terminal using a secondary cell, and that receives, based on the scheduling information, the random access response including timing information; and a processor that controls, based on the timing information included in the random access response, uplink transmission timing for a timing advance (TA) group including the second base station.

2. The terminal of claim 1, wherein the TA group is notified by RRC signaling.

3. The terminal of claim 1, wherein the identifier of the terminal is a Cell-Radio Network Temporary Identifier (C-RNTI).

4. The terminal of claim 1, wherein the timing information includes a TA value.

5. A communication method executed by a terminal, the method comprising:

receiving, using an identifier of the terminal, scheduling information of a random access response transmitted from a second base station included in a group in which a first base station is included, the first base station communicating with the terminal using a secondary cell, and receiving, based on the scheduling information, the random access response including timing information; and controlling, based on the timing information included in the random access response, uplink transmission timing for a timing advance (TA) group including the second base station.

6. A radio communication system comprising:

a terminal;

a first base station that communicates with the terminal using a secondary cell; and a second base station included in a group in which the first base station is included, wherein the second base station includes a transmitter that transmits, to the terminal, scheduling information of a random access response, wherein the terminal includes a receiver that receives, using an identifier of the terminal, the scheduling information of the random access response transmitted from the second base station, and that receives, based on the scheduling information, the random access response including timing information, and a processor that controls, based on the timing information included in the random access response, uplink transmission timing for a timing advance (TA) group including the second base station.

* * * * *